United States Patent
Xiao et al.

(10) Patent No.: US 8,615,242 B2
(45) Date of Patent: Dec. 24, 2013

(54) METHOD AND USER EQUIPMENT FOR CELL SELECTION OF HETEROGENEOUS NETWORK

(75) Inventors: Dengkun Xiao, Beijing (CN); Yuan He, Beijing (CN); Tongwei Qu, Shenzhen (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/548,140

(22) Filed: Jul. 12, 2012

(65) Prior Publication Data

US 2012/0276909 A1 Nov. 1, 2012

Related U.S. Application Data

(63) Continuation of application No. PCT/CN2011/070209, filed on Jan. 12, 2011.

(30) Foreign Application Priority Data

Jan. 12, 2010 (CN) .......................... 2010 1 0000577

(51) Int. Cl.
*H04W 36/00* (2009.01)
(52) U.S. Cl.
USPC ............... 455/437; 455/435.2; 455/435.3; 455/448; 455/449; 455/436; 455/443; 455/452.2; 455/432.1; 370/331
(58) Field of Classification Search
USPC .......... 455/435.2, 435.3, 448, 449, 436, 443, 455/437, 452.2, 432.1; 370/331
See application file for complete search history.

(56) References Cited

U.S. PATENT DOCUMENTS

2006/0099943 A1* 5/2006 Koo ........................... 455/432.1
2009/0097451 A1* 4/2009 Gogic .......................... 370/331
(Continued)

FOREIGN PATENT DOCUMENTS

CN 1387332 A 12/2002
CN 1533196 A 9/2004
(Continued)

OTHER PUBLICATIONS

3$^{rd}$ Generation Partnership Project; Technical Specification Group Radio Access Network; Evolved Universal Terrestrial Radio Access (E-UTRA); Requirements for support of radio resource management (Release 8), 3GPP TS 36.133 V8.7.0, Sep. 2009, 317 pages.

(Continued)

*Primary Examiner* — Kwasi Karikari
(74) *Attorney, Agent, or Firm* — Slater & Matsil, L.L.P.

(57) ABSTRACT

Embodiments of the present invention provide a method and a user equipment for cell selection of a heterogeneous network. The UE selects, a cell with a highest signal measurement value in a carrier frequency synchronizes to the cell, and receives broadcast information of the cell. If the cell is a macro cell, the broadcast information carries an extended indicator bit and the extended indicator bit is used to identify whether a low-power cell exists in the coverage of the macro cell. If the extended indicator bit identifies that the low-power cell exists in the coverage of the macro cell, the low-power cell in the macro cell is searched for, and if a low-power cell in the macro cell satisfies an S rule, the UE selects the lower-power cell as a serving cell and camps.

12 Claims, 3 Drawing Sheets

(56) References Cited

U.S. PATENT DOCUMENTS

| | | | |
|---|---|---|---|
| 2009/0111376 A1* | 4/2009 | Kim et al. | 455/9 |
| 2009/0190500 A1 | 7/2009 | Ji et al. | |
| 2009/0213812 A1 | 8/2009 | Park et al. | |
| 2009/0238114 A1* | 9/2009 | Deshpande et al. | 370/328 |
| 2009/0239535 A1 | 9/2009 | Chun et al. | |
| 2009/0247170 A1 | 10/2009 | Srinivasan et al. | |
| 2009/0288140 A1* | 11/2009 | Huber et al. | 726/2 |
| 2010/0027510 A1* | 2/2010 | Balasubramanian et al. | 370/332 |
| 2010/0029274 A1* | 2/2010 | Deshpande et al. | 455/435.3 |
| 2010/0067433 A1* | 3/2010 | Cheng et al. | 370/320 |
| 2010/0093358 A1* | 4/2010 | Cheong et al. | 455/444 |
| 2010/0203892 A1* | 8/2010 | Nagaraja et al. | 455/437 |
| 2011/0028152 A1 | 2/2011 | Makoto | |
| 2011/0092200 A1 | 4/2011 | Charbit et al. | |

FOREIGN PATENT DOCUMENTS

| | | |
|---|---|---|
| CN | 101309499 A | 11/2008 |
| CN | 101345981 A | 1/2009 |
| JP | 2009-130602 | 6/2009 |
| JP | 2011-516009 | 5/2011 |
| JP | 2011-518472 | 6/2011 |
| WO | 2008141563 | 11/2008 |
| WO | WO 2009/147498 | 12/2009 |

OTHER PUBLICATIONS

3$^{rd}$ Generation Partnership Project; Technical Specification Group Radio Access Network; Evolved Universal.Terrestrial Radio Access (E-UTRA); Radio Resource Control (RRC); Protocol specification (Release 8), 3GPP TS 36.331 V8.7.0, Sep. 2009, 208 pages.

3$^{rd}$ Generation Partnership Project; Technical Specification Group Radio Access Network; Evolved Universal Terrestrial Radio Access (E-UTRA); User Equipment (UE) procedures in idle mode (Release 8), 3GPP TS 36.304 V8.7.0, Sep. 2009, 30 pages.

3$^{rd}$ Generation Partnership Project; Technical Specification Group Radio Access Network; Further Advancements for E-UTRA Physical Layer Aspects (Release 9), 3GPP TR 36.814 V1.5.0, Nov. 2009, 53 pages.

Huawei, "LI Delay Impact on ICIC in type 1 Relay," 3GPP TSG RAN WG1 Meeting #57bis, R1-092376, Los Angeles, USA, Jun. 29-Jul. 3, 2009, 6 pages.

Qualcomm Europe, "Heterogeneous deployment studies for LTE-Advanced," 3GPP TSG-RAN WG1 #58, R1-093140, Shenzhen, China, Aug. 24-28, 2009, pp. 1-3.

International Search Report received in International Application No. PCT/CN2011/070209, Applicant: Huawei Technologies Co., Ltd. et al., mailed Apr. 21, 2011, 4 pages.

Written Opinion of the International Searching Authority received in International Application No. PCT/CN2011/070209, Applicant: Huawei Technologies Co., Ltd. et al., mailed Apr. 21, 2011, 3 pages.

Office Action in JP Application No. 2012-548329, mailing date: Sep. 24, 2013, 9 pages.

\* cited by examiner

FIG. 6

METHOD AND USER EQUIPMENT FOR CELL SELECTION OF HETEROGENEOUS NETWORK

CROSS-REFERENCE TO RELATED APPLICATIONS

This application is a continuation of International Application No. PCT/CN2011/070209, filed on Jan. 12, 2011, which claims priority to Chinese Patent Application No. 201010000577.4, filed on Jan. 12, 2010, both of which are hereby incorporated by reference in their entireties.

FIELD OF THE INVENTION

The present invention relates to the field of communication technologies, and in particular, to a method and a user equipment for cell selection of a heterogeneous network.

BACKGROUND OF THE INVENTION

In an existing LTE (Long-Term Evolution, long Term evolution) system, when selecting an initial cell, a UE (User Equipment, user equipment) searches for a radio frequency channel in an E-UTRA (Evolved UMTS Terrestrial Radio Access, evolved UTMS terrestrial radio access) frequency band according to its own capabilities so as to find a proper cell. For each carrier frequency, the UE only searches for a cell with strongest signals and selects the cell as a serving cell.

The present cell selection is determined according to RSRP (Reference Signal Received Power, reference signal received power) signal strength or SCH_RP (Synchronization Channel Received Power, synchronization channel received power) signal strength of the cell and a cell selection parameter which is in broadcast information. For a specific carrier frequency, the UE makes a cell selection decision on only one cell that has strongest RSRP signal strength or SCH_RP signal strength. The so-called cell selection decision is a decision based on an S rule and according to the cell selection parameter in the broadcast information.

An LTE-A (Long-Term Evolution Advanced, long term evolution advanced) system is a heterogeneous network, and it is a mixed scene where low-power cells such as a pico cell (pico cell, hotzone), a femto cell (femto cell, HeNB), and a relay node (relay node, RN) cell are included in the coverage of a macro cell (macro cell, eNB). Therefore, in a heterogeneous network scene, uplink signals sent by the UE cause serious interference in the network.

SUMMARY OF THE INVENTION

The objective of embodiments of the present invention is to provide a method and a user equipment for cell selection of a heterogeneous network, so as to reduce interference in the network when the UE sends uplink signals.

In one aspect, a method for cell selection of a heterogeneous network is provided, where the method includes:

selecting, by a user equipment UE, a cell with a highest signal measurement value in a carrier frequency;

synchronizing, by the UE, to the cell, and receiving broadcast information of the cell; where if the cell is a macro cell, the broadcast information carries an extended indicator bit, and the extended indicator bit is used to identify whether a low-power cell exists in the coverage of the macro cell; and if the extended indicator bit identifies that the low-power cell exists in the coverage of the macro cell, searching for the low-power cell in the macro cell, and if a low-power cell in the macro cell satisfies an S rule, selecting, by the UE, the lower-power cell as a serving cell and camping.

In another aspect, a user equipment is provided, which includes:

a selecting module, configured to select a cell with a highest signal measurement value in a carrier frequency;

a processor, configured to synchronize to the cell that is selected by the selecting module and receive broadcast information of the cell;

a detecting module, configured to detect, if the cell is a macro cell and the broadcast information that is received by the processor carries an extended indicator bit, whether a low-power cell exists in the coverage of the macro cell, where whether the low-power cell exists in the coverage of the macro cell is identified by the extended indicator bit;

a searching module, configured to search, when the detecting module detects that the extended indicator bit identifies that the low-power cell exists in the coverage of the macro cell, for a low-power cell in the macro cell; and a camping module, configured to select, when the searching module finds that a low-power cell in the macro cell satisfies an S rule, the low-power cell as a serving cell and camp.

In embodiments of the present invention, the UE selects the cell with the highest signal measurement value in the carrier frequency. The UE synchronizes to the cell and receives the broadcast information of the cell. If the cell is the macro cell, the broadcast information carries the extended indicator bit, and the extended indicator bit is used to identify whether the low-power cell exists in the coverage of the macro cell; if the extended indicator bit identifies that the low-power cell exists in the coverage of the macro cell, the lower-power cell in the macro cell is searched for; if a low-power cell in the macro cell satisfies the S rule, the UE selects the low-power cell as the serving cell and camps. Therefore, the UE preferentially selects the low-power cell to reduce interference in the low-power cell when the UE sends the uplink signals, thereby ensuring normal throughput of the UE and the cell.

DETAILED DESCRIPTION OF THE EMBODIMENTS

To make the foregoing objectives, features, and advantages of the present invention more evident and comprehensible, the present invention is further described in detail with reference to the accompanying drawings and specific embodiments in the following.

In the embodiments of the present invention, a type of a cell with highest signal strength is distinguished first; when the cell is a macro cell, a low-power cell in the macro cell is further searched for, and the low-power cell is tried to be selected as a serving cell so as to reduce interference in a network.

Figure 1:
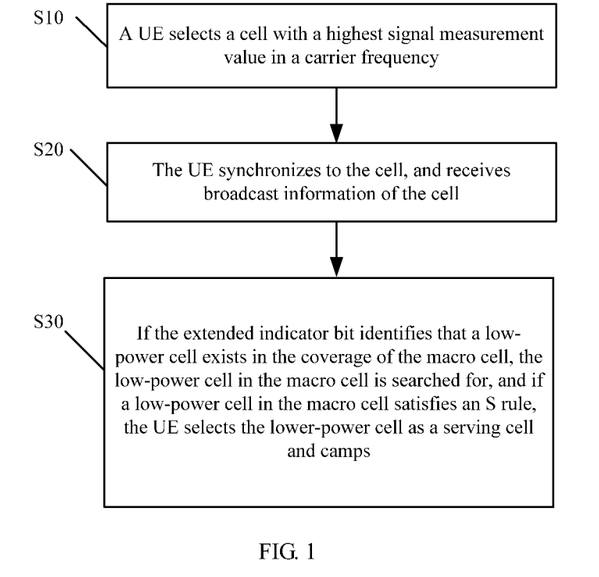
FIG. 1 is a schematic flow chart of a method for cell selection of a heterogeneous network according to an embodiment of the present invention.

An embodiment provides a method for cell selection of a heterogeneous network, as shown in FIG. 1, where the method includes:

S10: A UE selects a cell with a highest signal measurement value in a carrier frequency.

S20: The UE synchronizes to the cell, and receives broadcast information of the cell.

If the cell is a macro cell, the broadcast information carries an extended indicator bit, and the extended indicator bit is used to identify whether a low-power cell exists in the coverage of the macro cell.

S30: If the extended indicator bit identifies that the low-power cell exists in the coverage of the macro cell, the low-power cell in the macro cell is searched for, and if a low-power cell in the macro cell satisfies an S rule, the UE selects the lower-power cell as a serving cell and camps.

After the UE selects the macro cell as the serving cell, very serious interference in uplink intra-frequency signals of the low-power cell is caused when the UE sends uplink signals; compared with the interference in other cells caused by uplink signals that are sent to the low-power cell, such interference is overwhelming and affects the throughput of the UE and the cell.

Therefore, in the embodiment of the present invention, the low-power cell is selected as the serving cell so as to reduce the interference in the low-power cell when the UE sends the uplink signals, thereby ensuring the throughput of the UE and the cell.

The method of the embodiment of the present invention is introduced in detail with reference to the accompanying drawings in the following.

Figure 2:
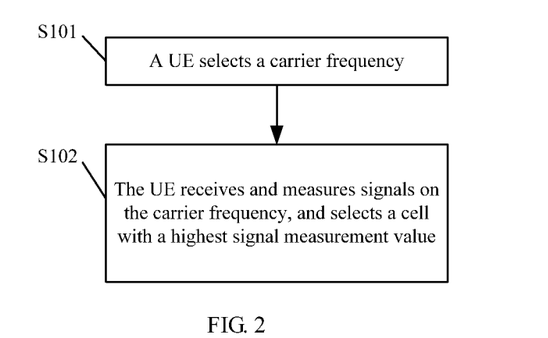
FIG. 2 is a schematic flow chart of specific implementation of step S10 in FIG. 1.

As shown in FIG. 2, step S10 may specifically include:

S101: The UE selects a carrier frequency.

The carrier frequency that the UE can select is decided by the performance of the UE.

S102: The UE receives and measures signals on the carrier frequency, and selects a cell with the highest signal measurement value; the signals may be RSRP signals, RSRQ (Reference Signal Received Quality, reference signal received quality) signals, or SCH_RP signals, and the signal measurement value may accordingly be a signal strength measurement value of RSRP, a signal strength measurement value of RSRQ, or a signal strength measurement value of SCH_RP.

The broadcast information of the cell includes one MIB (Master Information Block, master information block) and multiple SIBs (System Information Block, system information block). The MIB includes relatively few bits which is used to carry the most basic information of the cell, such as bandwidth and system frame number; the SIB is classified into multiple types: SIB1 (System Information Block Type 1, system information block type 1) carries a cell selection parameter, SIB2 carries radio resource configuration parameter information of the cell (which is the same for all UEs), and SIB3 to SIB8 all carry some cell reselection parameters.

Step S20: The UE synchronizes to the cell, and receives broadcast information of the cell.

If the cell is the macro cell, the broadcast information carries an extended indicator bit, and the extended indicator bit is used to identify whether the low-power cell exists in the coverage of the macro cell. Whether the low-power cell exists in the coverage of the macro cell may be specifically implemented by the extended indicator bit in the SIB1 in the broadcast information of the macro cell, for example, a value of the extended indicator bit being 1 represents that there is the low-power cell, and the value being 0 represents that there is no low-power cell; and may also be implemented by an extended indicator bit in other system information blocks of the broadcast information, such as SIB2 or SIB3.

Step S30: If the extended indicator bit identifies that the low-power cell exists in the coverage of the macro cell, the low-power cell in the macro cell is searched for, and if a low-power cell in the macro cell satisfies the S rule, the UE selects the lower-power cell as the serving cell and camps.

A specific implementation manner for judging whether the cell is the low-power cell or the macro cell may be: According to the radio resource configuration parameter information in the SIB2 of the broadcast information, for example, the signal power and the maximum transmit power of a base station in it, when the proportion of the signal power to the maximum transmit power of the base station reaches a criterion of the macro cell, the cell is determined as the macro cell; if the proportion reaches a criterion of the low-power cell, the cell is determined as the low-power cell.

Whether the cell satisfies the S rule may be calculated according to the cell selection parameter in the SIB1 of the broadcast information of the cell.

This embodiment provides the following three implementation manners for the searching for the low-power cell in the macro cell:

(1) Within a preset time, the UE sorts received signals in the order of signal strength. The UE synchronizes to a corresponding cell in sequence in the order of the signal strength, receives the broadcast information of the cell, and searches for the low-power cell according to the broadcast information. If the searched cell is the low-power cell, according to the broadcast information of the low-power cell, whether the low-power cell satisfies the S rule is judged.

According to the descending order of the signal strength, the UE synchronizes to the corresponding cell in sequence, receives the broadcast information of the cell, and judges, according to the broadcast information of the cell, whether the cell is the low-power cell and satisfies the S rule, and when the cell is the low-power cell and satisfies the S rule, selects the cell as the serving cell and camps. When the cell is not the low-power cell or does not satisfy the S rule, select a cell whose signal strength is one level lower than the signal strength of the current cell to continue the foregoing process of synchronizing, receiving, and judging. The judging, according to the broadcast information of the cell, whether the cell is the low-power cell, is the same as the judging method in step S20.

Because the time required for synchronizing and reading a cell is rather short relative to the preset time, there is a very high probability to find the low-power cell after several processes of synchronizing and reading the broadcast information of the cell. Therefore, the manner (1) is feasible under the performance requirement of an existing system.

(2) In this implementation manner, the broadcast information of the macro cell further carries a list of identities of low-power cells in the coverage of the macro cell; in this implementation manner, the cell may scramble the cell identities into signals, and after receiving and measuring the signals, the UE can obtain the cell identities by parsing.

For example, the list of low-power cell identities may be added to the SIB1 of the broadcast information of the macro cell, and the list of low-power cell identities may also be added to other system information blocks of the broadcast information, such as SIB2 or SIB3.

This implementation manner may include: within the preset time, the UE sorts the received signals in the order of the signal strength, searches in sequence until a cell whose cell identity in the signals matches the identity in the list of the low-power cell identities is obtained, synchronizes to the matched cell, receives the broadcast information of the matched cell, and judges, according to the broadcast information of the matched cell, whether the cell satisfies the S rule.

The UE performs matching in the list of low-power cell identities in the broadcast information of the macro cell according to the cell identities in the signals, and if a matched item exists in the list of low-power cell identities, determines that the matched cell is the low-power cell in the coverage of the macro cell; and then the UE synchronizes to the matched cell and receives the broadcast information of the matched cell, and judges, according to the cell selection parameter in the broadcast information of the matched cell, whether the matched cell satisfies the S rule.

In this implementation manner, whether the cell is the low-power cell is judged without requiring synchronization to the cells that correspond to the received signals one by one. The cell is judged as the low-power cell through the list of low-power cell identities in the broadcast information of the macro cell and then synchronization is performed, which consumes shorter time as compared with the implementation manner (1).

(2) In this implementation manner, the broadcast information of the macro cell further carries the cell selection parameters of each low-power cell in a list of identities of low-power cells in the coverage of the macro cell.

In this implementation manner, the cell may scramble the cell identities into the signals, and the UE can obtain the cell identities by parsing after receiving and measuring the signals.

Specifically, the list of low-power cell identities and the cell selection parameters of each low-power cell in the list may be added to the SIB1 in the broadcast information of the macro cell, and the list of the low-power cell identities and the cell selection parameters of each low-power cell in the list may also be added to other system information blocks of the broadcast information, such as SIB2 or SIB3.

This implementation manner is: within a preset time, the UE sorts the received signals in the order of the signal strength, searches in sequence until a cell whose cell identity in the signals matches the identity in the list of the low-power cell identities is obtained, and judges, according to the cell selection parameter of the matched cell, whether the cell satisfies the S rule.

The UE performs matching in the list of the low-power cell identities in the broadcast information of the macro cell according to the cell identities, and if a matched item exists in the list of the low-power cell identities, determines that the matched cell is the low-power cell in the coverage of the macro cell; and judges, by using the low-power cell selection parameter in the broadcast information of the macro cell, whether the matched cell satisfies the S rule. When the matched cell satisfies the S rule, the UE selects the matched cell as the serving cell and camps. If the cell does not match the list of the low-power cell identities or does not satisfy the S rule, the UE selects a cell whose signal strength is one level lower than the signal strength of the current cell to continue the foregoing process of synchronizing, receiving, and judging.

In the implementation manner, because both the list of the identities of the low-power cells in the coverage of the macro cell and the cell selection parameters of each low-power cell in the list are added to the broadcast information of the macro cell, the UE can obtain the cell selection parameter of the low-power cell without synchronizing to each low-power cell. Therefore, as compared with the implementation manner (2), the speed of performing cell selection is higher.

The foregoing three implementation manners may be selected according to the actual condition of the macro cell.

If the extended indicator bit identifies that no low-power cell exists in the coverage of the macro cell or no low-power cell that is found in the macro cell satisfies the S rule, the method further includes:

judging, according to the broadcast information of the macro cell, whether the macro cell satisfies the S rule;

if the macro cell satisfies the S rule, selecting the macro cell as the serving cell and camping; and if the macro cell does not satisfy the S rule, selecting other carrier frequencies to perform cell selection. For step S20, when the cell with the highest signal measurement value is the low-power cell but does not satisfy the S rule, the method of this embodiment may further include: selecting other carrier frequencies to perform cell selection;

for step S30, if the cell is a macro cell, when no low-power cell exists in the coverage of the macro cell or no low-power cell in the macro cell satisfies the S rule, the method of this embodiment may further include: calculating, according to the broadcast information of the macro cell, whether the macro cell satisfies the S rule; if satisfying, selecting the macro cell as the serving cell and camping, or if not satisfying, selecting other carrier frequencies to perform cell selection.

Figure 3:
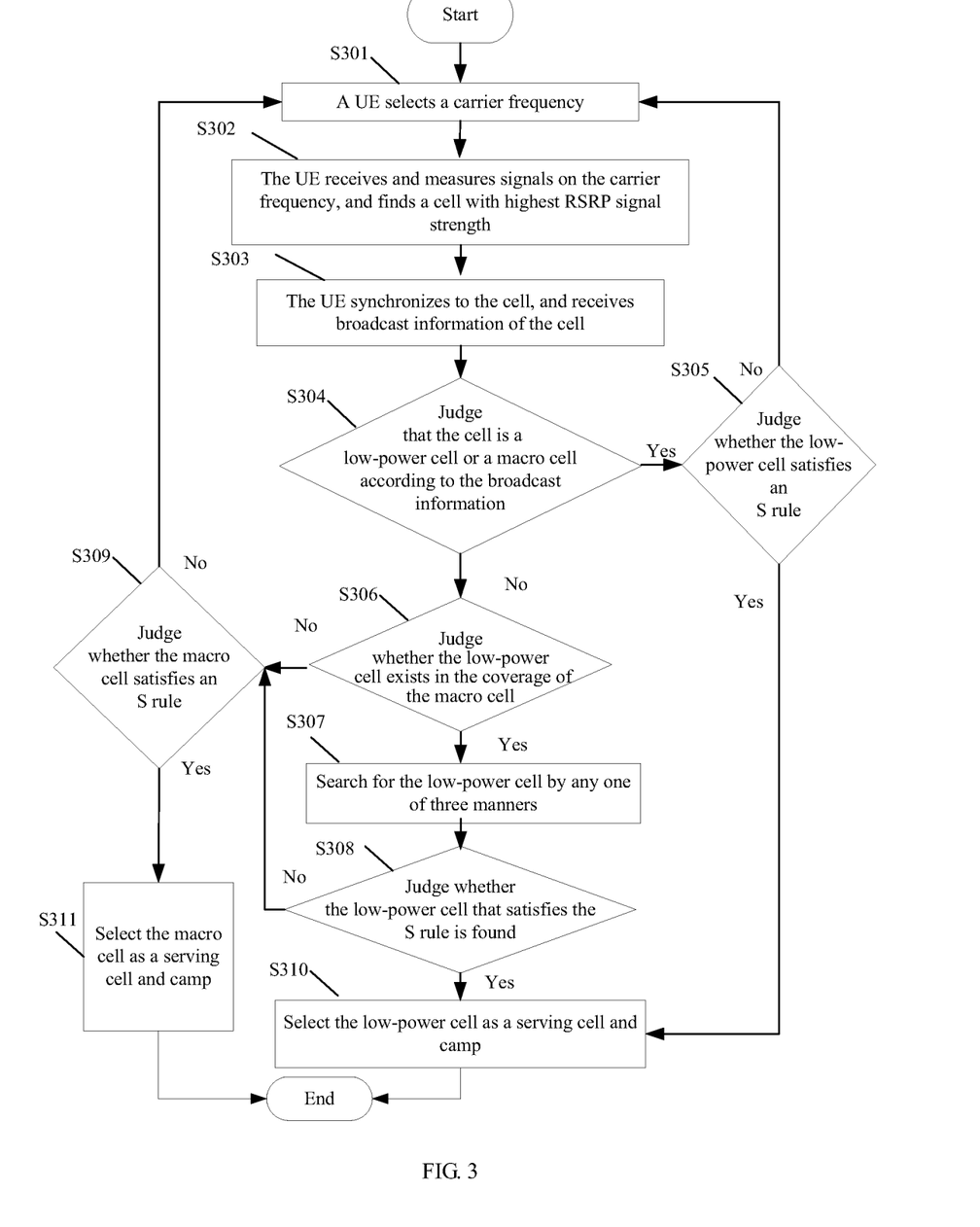
FIG. 3 is a schematic flow chart of a method for cell selection of a heterogeneous network according to an embodiment of the present invention.

Referring to FIG. 3, the method for cell selection of the heterogeneous network according to the embodiment of the present invention is explained through a specific example in the following, where it is described taking the signals being the RSRP signals as an example.

S301: The UE selects a carrier frequency.

S302: The UE receives and measures the signals on the carrier frequency, and finds a cell with the strongest RSRP signal strength.

S303: The UE synchronizes to the cell, and receives broadcast information of the cell.

S304: Judge that the cell is the low-power cell or the macro cell according to the broadcast information.

The implementation manner for judging whether the cell is the low-power cell or the macro cell is the same as the process of judging according to the radio resource configuration parameter information in the SIB2 of the broadcast information in step S30.

If it is the low-power cell, S305 is executed to judge whether the low-power cell satisfies the S rule. If satisfying, S310 is executed to select the low-power cell as the serving cell and camp. If not satisfying, step S301 is re-executed.

If it is the macro cell, step S306 is executed to judge whether the low-power cell exists in the coverage of the macro cell.

Specifically, the judging may be performed according to the extended indicator bit in the broadcast information of the macro cell.

If yes, S307 is executed to search for low-power cells according to any one of the foregoing three manners.

If no, S309 is executed to judge whether the macro cell satisfies the S rule. If satisfying, S311 is executed to select the macro cell as the serving cell and camp. If not satisfying, step S301 is re-executed.

S308: Judge whether a low-power cell that satisfies the S rule is found through step S307; if yes, execute step S310; if no, execute step S309.

In the existing heterogeneous network scene, the reason why the uplink signals sent by the UE often cause serious interference in the network lies in that: in the conventional cell selection technology, when cell selection is performed, for a certain carrier frequency, selects only a cell with the strongest RSRP signal strength or SCH_RP signal strength to make a decision based on the S rule. For the heterogeneous network scene that includes an RN, when the UE is in the coverage of both the macro cell and the low-power cell at the same time, the base station transmit power of the low-power cell is lower than that of the macro cell, and the UE receives intra-frequency RSRP signals from different cells; after being propagated in an radio environment, there is a very high probability that the RSRP signal strength of the low-power cell is lower than that of the macro cell. In this case, the UE neither select the low-power cell as the serving cell nor camp, but selects the macro cell as the serving cell. As a result, uplink signals of the UE cause very serious interference in the network.

In the embodiment of the present invention, the UE selects the cell with the highest signal measurement value in the carrier frequency; the UE synchronizes to the cell and receives the broadcast information of the cell. If the cell is the macro cell, the broadcast information carries the extended indicator bit, and the extended indicator bit is used to identify whether the low-power cell exists in the coverage of the macro cell; if the extended indicator bit identifies that the low-power cell exists in the coverage of the macro cell, the lower-power cell in the macro cell is searched for; if a low-power cell in the macro cell satisfies the S rule, the UE selects the low-power cell as the serving cell and camps. Therefore, the UE preferentially selects the low-power cell to reduce the interference in the low-power cell when the UE sends the uplink signals, thereby ensuring the normal throughput of the UE and the cell.

Figure 4:
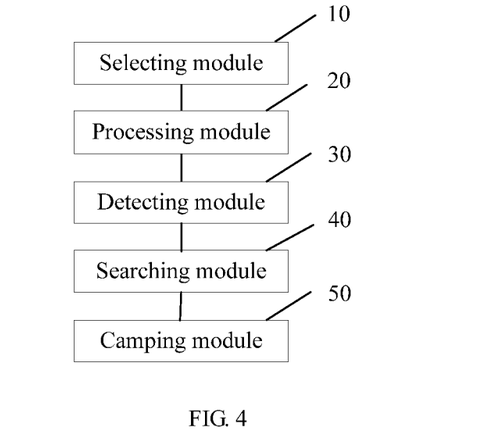
FIG. 4 is a schematic structural diagram of a user equipment according to an embodiment of the present invention.

An embodiment provides a user equipment, as shown in FIG. 4, including:

a selecting module 10, configured to select a cell with a highest signal measurement value in a carrier frequency;

a processing module 20, configured to synchronize to the cell selected by the selecting module 10 and receive broadcast information of the cell;

a detecting module 30, configured to detect, if the cell is a macro cell and the broadcast information that is received by the processing module carries an extended indicator bit, whether a low-power cell exists in the coverage of the macro cell, where whether the low-power cell exists in the coverage of the macro cell is identified by the extended indicator bit;

a searching module 40, configured to search for, when the detecting module 30 detects that the extended indicator bit identifies that the low-power cell exists in the coverage of the macro cell, the low-power cell in the macro cell; and a camping module 50, configured to select, when the searching module 40 finds that a low-power cell in the macro cell satisfies an S rule, the low-power cell as a serving cell and camp; and when the cell is the macro cell and a certain low-power cell in the macro cell satisfies the S rule, select the low-power cell as the serving cell and camp.

Figure 5:
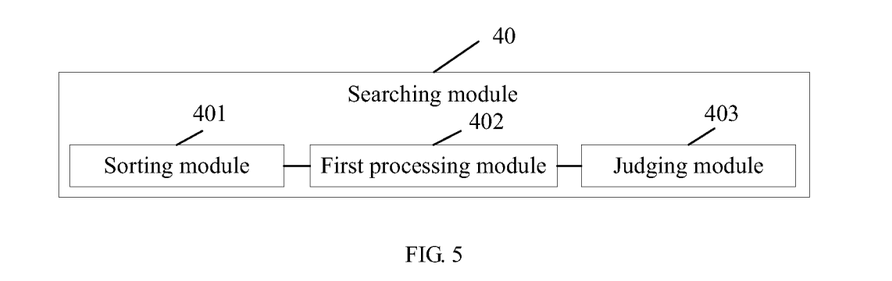
FIG. 5 is another schematic structural diagram of a user equipment according to an embodiment of the present invention.

As shown in FIG. 5, the searching module may further include:

a sorting module 401, configured to sort received signals in order of signal strength within a preset time;

a first processing module 402, configured to synchronize with a corresponding cell in sequence in the order of the signal strength according to a sorting result of the sorting module, receive the broadcast information of the cell, and search for the low-power cell according to the broadcast information; and a judging module 403, configured to judge, according to a search result of the first processing module, whether the low-power cell satisfies the S rule.

When the broadcast information of the macro cell further carries a list of identities of low-power cells in the coverage of the macro cell, optionally, the sorting module is further configured to sort the received signals in the order of the signal strength within the preset time; the first processing module is further configured to search in sequence according to the signal strength and according to the sorting result of the sorting module until a cell whose cell identity in the signals matches the identity in the list of low-power cell identities is obtained, synchronize to the matched cell, and receive the broadcast information of the matched cell; and the judging module is further configured to judge, according to the broadcast information which is of the matched cell and is received by the first processing module, whether the cell satisfies the S rule.

When the broadcast information of the macro cell further carries cell selection parameters of each low-power cell in the list of the identities of the low-power cells in the coverage of the macro cell, the sorting module is further configured to sort the received signals in the order of the signal strength within the preset time; the first processing module is further configured to search in sequence according to the signal strength and according to the sorting result of the sorting module until a cell whose cell identity in the signals matches the identity in the list of the low-power cell identities is obtained; and the judging module is further configured to judge, according to the cell selection parameter which is of the matched cell and is obtained by the first processing module, whether the cell satisfies the S rule.

The searching module 40 may be further configured to judge, according to the broadcast information of the macro cell, whether the macro cell satisfies the S rule when the extended indicator bit identifies that no low-power cell exists in the coverage of the macro cell or no low-power cell that is found in the macro cell satisfies the S rule; and if the macro cell satisfies the S rule, invoke the camping module 50 to select the macro cell as the serving cell and camp.

Figure 6:
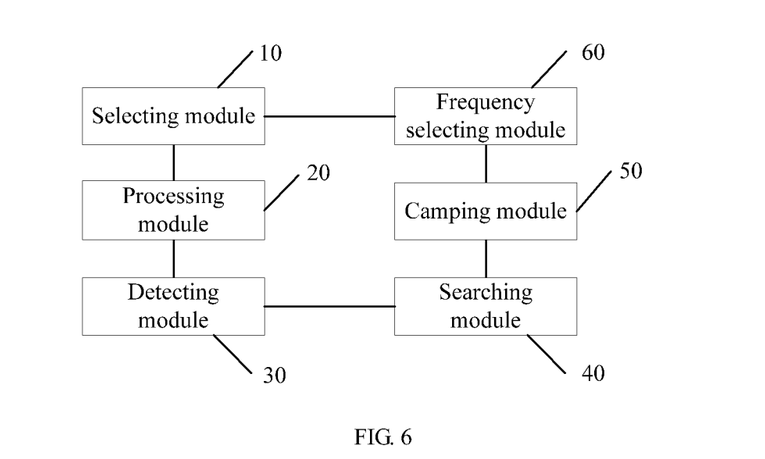
FIG. 6 is still another schematic structural diagram of a user equipment according to an embodiment of the present invention.

As shown in FIG. 6, the user equipment further includes: a frequency selecting module 60, configured to select other carrier frequencies when the macro cell does not satisfy the S rule.

In this embodiment, the user equipment selects the cell with the highest signal measurement value in the carrier frequency, synchronizes to the cell, and receives the broadcast information of the cell. If the cell is the macro cell, the broadcast information carries the extended indicator bit, and the extended indicator bit is used to identify whether the low-power cell exists in the coverage of the macro cell; if the extended indicator bit identifies that the low-power cell exists in the coverage of the macro cell, the lower-power cell in the macro cell is searched; if a low-power cell in the macro cell satisfies the S rule, the UE selects the low-power cell as the serving cell and camps. Therefore, the UE preferentially selects the low-power cell to reduce interference in the low-power cell when the UE sends uplink signals, thereby ensuring normal throughput of the UE and the cell.

Because relatively much content of the user equipment embodiment is similar to that of the method embodiment, the user equipment embodiment is briefly described, and reference may be made to the method embodiment for similar descriptions.

Persons of ordinary skill in the art may understand that all or a part of steps of the method in the foregoing embodiment may be implemented by a program instructing relevant hardware. The program may be stored in a computer-readable storage medium. When the program is executed, the following steps may be included: The user equipment UE selects the cell with the highest signal measurement value in the carrier frequency; the UE synchronizes to the cell and receives the broadcast information of the cell; if the cell is the macro cell, the broadcast information carries the extended indicator bit, and the extended indicator bit is used to identify whether the low-power cell exists in the coverage of the macro cell; and if the extended indicator bit identifies that the low-power cell exists in the coverage of the macro cell, the low-power cell in the macro cell is searched for, and if a low-power cell in the macro cell satisfies the S rule, the UE selects the lower-power cell as the serving cell and camps. The storage medium may be a ROM/RAM, a magnetic disk, a compact disk, and so on.

It should be noted that in this text, relational terms such as first and second are used only to differentiate an entity or operation from another entity or operation, and do not necessarily require or imply any such actual relationship or sequence between these entities or operations. Moreover, terms "include" and "comprise", or any other variation of the terms are intended to cover a non-exclusive inclusion. Therefore, a process, a method, an object, or a device that includes a series of elements, not only includes those elements, but also includes other elements that are not explicitly listed, or further includes inherent elements of the process, the method, the object, or the device. In a case with no more limitations, an element limited by a sentence "including one . . . " do not exclude a case that other same elements also exist in the process, the method, the object, or the device that includes the element.

The foregoing descriptions are merely exemplary embodiments of the present invention, and are not intended to limit the protection scope of the present invention. Any modification, equivalent replacement, or improvement made within the spirit and principle of the present invention should fall within the protection scope of the present invention.

What is claimed is:

1. A method for cell selection of a heterogeneous network, the method comprising:
   selecting, by a user equipment (UE), a first cell with a highest signal measurement value in a carrier frequency;
   synchronizing the UE to the first cell;
   receiving broadcast information of the first cell, wherein, if the first cell is a macro cell, the broadcast information of the first cell carries an extended indicator bit that is used to identify whether a second cell which power is less than a predetermined value exists in coverage of the macro cell;
   searching for the second cell from the macro cell if the extended indicator bit identifies that the second cell exists in the coverage of the macro cell; and
   determining, by the UE, the second cell as a serving cell and camping if the second cell satisfies an S rule;
   sorting, by the UE, received signals in order of signal strength within a preset time;
   synchronizing, by the UE, with cells in a sequence corresponding to the order of the signal strength;
   receiving, by the UE, broadcast information of the cells;
   searching, by the UE, for the second cell according to the broadcast information of the cells; and
   determining, by the UE, whether the second cell satisfies the S rule according to the broadcast information of the second cell if the second cell is searched.

2. The method according to claim 1, wherein, if the first cell is the macro cell, the broadcast information of the first cell further carries a list of identities of low-power cells each which power is less than the predetermined value in the coverage of the macro cell.

3. The method according to claim 2, further comprising:
   sorting, by the UE, received signals in order of signal strength within a preset time;
   searching, by the UE, the signals in a sequence until the second cell whose cell identity matches an identity in the list of the low-power cell identities is obtained;
   synchronizing, by the UE, to the second cell;
   receiving, by the UE, broadcast information of the second cell; and
   determining, by the UE, whether the second cell satisfies the S rule according to the broadcast information of the second cell.

4. The method according to claim 2, wherein, if the first cell is the macro cell, the broadcast information of the first cell further carries cell selection parameters of each low-power cell in the list of identities of the low-power cells.

5. The method according to claim 4, further comprising:
   sorting, by the UE, received signals in order of signal strength within a preset time;
   searching, by the UE, the signals in a sequence until the second cell whose cell identity matches an identity in the list of low-power cell identities is obtained; and
   determining, according to cell selection parameter of the second cell, whether the second cell satisfies the S rule.

6. The method according to claim 1, wherein the extended indicator bit identifies that no the second cell exists in the coverage of the macro cell or the second cell exists in the coverage of the macro cell but the second cell does not satisfy the S rule, the method further comprises:
   determining whether the macro cell satisfies the S rule according to broadcast information of the macro cell;
   determining the macro cell as the serving cell and camping if the macro cell satisfies the S rule; and
   determining other carrier frequencies which different from the carrier frequency to perform cell selection if the macro cell does not satisfy the S rule.

7. A user equipment, comprising:
   a processor, configured to select a first cell with a highest signal measurement value in a carrier frequency;
   and to synchronize to the first cell;
   a receiver, configured to receive broadcast information of the first cell;
   wherein the processor is further, configured to detect whether a low-power cell exists in coverage of the cell if the cell is a macro cell and the broadcast information of the first cell that is received by the processor carries an extended indicator bit, wherein whether the low-power cell which power is less than a predetermined value exists in the coverage of the macro cell;
   the processor, configured to search the second cell from if the extended indicator bit identifies that the second cell exists in the coverage of the macro cell; and
   the processor, configured to determine the second cell as a serving cell and camp if the second cell satisfies an S ruler;
   the processor is further configured to sort received signals in order of signal strength within a preset time, and synchronize with cells in a sequence corresponding to the order of the signal strength;
   the receiver is further configured to receive the broadcast information of the cells;

the processor is further configured to search for the second cell according to the broadcast information of the cells; and determine whether the second cell satisfies the S rule according to broadcast information of the second cell if he second cell is searched.

8. The user equipment according to claim 7, wherein the processor is further configured to:

if the first cell is a macro cell, and the broadcast information of the first cell further carries a list of identities of low-power cells each which power is less than the predetermined value in the coverage of the macro cell;

sort the received signals in the order of signal strength within the preset time;

search the signals in a sequence until the second cell whose cell identity matches an identity in the list of the low-power cell identities is obtained;

synchronize to the second cell;

the receiver is further configured to receive broadcast information of the second cell; and the processor is further configured to determine whether the second cell satisfies the S rule according to the broadcast information of the second cell.

9. The user equipment according to claim 8, wherein the processor is further configured to:

sort received signals in order of signal strength within a preset time;

search the signals in a sequence until the second cell whose cell identity matches an identity in the list of low-power cell identities is obtained; and determine according to the cell selection parameter of the second cell, whether the second cell satisfies the S rule.

10. The user equipment according to claim 7, wherein the processor is further configured to:

the extended indicator bit identifies that no the second cell exists in the coverage of the macro cell or the second cell exists in the coverage of the macro cell but the second cell does not satisfy the S rule, determine whether the macro cell satisfies the S rule according to the broadcast information of the macro cell, determine the macro cell as the serving cell and camping if the macro cell satisfies the S rule; and determining other carrier frequencies which differ from the carrier frequency to perform cell selection if the macro cell does not satisfy the S rule.

11. The user equipment according to claim 10, further comprising a frequency selecting module, configured to select other carrier frequencies when the macro cell does not satisfy the S rule.

12. A non-transitory computer-readable storage medium with an executable program stored thereon, wherein the program instructs a processor to perform the steps of a user terminal according to claim 1.

* * * * *

UNITED STATES PATENT AND TRADEMARK OFFICE
CERTIFICATE OF CORRECTION

Page 1 of 1

PATENT NO. : 8,615,242 B2
APPLICATION NO. : 13/548140
DATED : December 24, 2013
INVENTOR(S) : Dengkun Xiao It is certified that error appears in the above-identified patent and that said Letters Patent is hereby corrected as shown below:

In the Claims:

In Col. 10, line 61, claim 7, delete "ruler" and insert --rule--.
In Col. 11, line 5, claim 7, delete "he" and insert --the--.

Signed and Sealed this
Eighteenth Day of March, 2014

Michelle K. Lee
*Deputy Director of the United States Patent and Trademark Office*